United States Patent [19]

Tokuda

[11] Patent Number: 4,990,950
[45] Date of Patent: Feb. 5, 1991

[54] PHOTOGRAPHIC PRINTING SYSTEM
[75] Inventor: Kanji Tokuda, Kanagawa, Japan
[73] Assignee: Fuji Photo Film Co., Ltd., Kanagawa, Japan
[21] Appl. No.: 416,625
[22] Filed: Oct. 3, 1989
[30] Foreign Application Priority Data Oct. 3, 1988 [JP] Japan .................. 63-247527
Oct. 3, 1988 [JP] Japan .................. 63-247530
Oct. 5, 1988 [JP] Japan .................. 63-251658

[51] Int. Cl.$^5$ .................................. G03B 27/80
[52] U.S. Cl. .................................. 355/38; 355/77
[58] Field of Search .................. 355/38, 68, 77

[56] References Cited

U.S. PATENT DOCUMENTS 4,099,862 7/1978 Bickl et al. ............ 355/38 X
4,797,712 1/1989 Hayashi et al. .......... 355/38
4,873,546 10/1989 Zahn et al. ............. 355/38

*Primary Examiner*—L. T. Hix
*Assistant Examiner*—D. Rutledge
*Attorney, Agent, or Firm*—Sughrue, Mion, Zinn, Macpeak & Seas

[57] ABSTRACT

A photographic printing system for automatically determining an exposure correction value is used in a printer to correct, if necessary, an exposure effected based on large area transmittance densities. The system includes an image sensor disposed between the printer and a data reading device for measuring a number of points of the frame of the photographic film, and outputting density data of the frame accordingly. A data operation unit is provided to calculate exposure correction data for the frame based on the data from the data reader and the sensor.

17 Claims, 4 Drawing Sheets

PHOTOGRAPHIC PRINTING SYSTEM

BACKGROUND OF THE INVENTION

The present invention relates to a photographic printing system, and more particularly to a color printing system in which exposure is controlled based on a large area transmittance density of an original film.

In a large scale photographic printing system, a large area transmittance density (LATD) is obtained first by color. Then, based on the LATD, exposure is controlled to provide a desirable print condition. Such an LATD printing system can yield the advantage of providing a print having a favorable density distribution when the print is made from a negative having no difference in density between a principal image, such as a human face, and the whole image of the negative.

Because of variations in negatives provided by customers, it is difficult to make satisfactory density controlled prints from almost all of the customers' negatives with an LATD printing system. As an example, in making a print from a negative including a human figure in a bright background or a human figure in a dark background (a condition generally referred to as having a density failure), or from a negative including an area having a bright color (any one of, or any combination of, red, green, blue, cyan, magenta and yellow) that is too large relative to a principal subject image, such as a human figure (a condition generally referred to as having a color failure), a principal subject image of the negative is exposed too little or to much, or with adverse effect from a color of the major part thereof, resulting in a print having imbalanced color and/or density.

To avoid such an adverse effect caused because of subject failures (density failure and color failure) in the LATD printing system, it has been preferred to inspect negatives prior to making prints from the negatives by the use of the LATD printing system, thereby correcting the exposure for each image frame of an original negative. In recent years, an improved LATD printing system in which exposure is effected with high accuracy has been developed, and has become increasingly popular. The improved LATD printing system measures an original negative to detect densities at a large number of points of the original negative, and classifies the image pattern of the original negative statistically based on the density distribution. The developed LATD printing system effects an exposure obtained from the image pattern, a characteristic value of a specific point or area, and an LATD of the original negative.

However, because conventional LATD printing systems are equipped with no automatic exposure correcting feature for avoiding occurrences of subject failure, it is necessary to provide exposure correcting data by inspecting negatives prior to making prints. Negative inspection is effected by an operator, and exposure correction value data is recorded manually, for example, on a paper tape by means of a so-called notcher-puncher. Such a negative inspection not only requires skill but also is quite inefficient. Accordingly, it is difficult for beginners to effect negative inspection with high accuracy and high efficiency.

It was thought that an automatic exposure correction value determining device for correcting an exposure in accordance with a pattern of image of a negative film should be provided separately from a printer, and attached to a large size of existing printer. In this case, because there is a difference between the processing capability of the printer and the computing ability of such an automatic exposure correction value determining device as being separately provided and in more detail, the speed of computing data for one frame in the automatic exposure correction value determining device is slower than the speed of computing data for one frame in the automatic exposure correction value determining device, which in turn is slower than the speed of printing one frame in the printer. As a result, the adaptation of the automatic exposure correction value determining device lowers the speed of processing of the printer.

SUMMARY OF THE INVENTION

In view of the foregoing, an object of the present invention is to provide a negative inspection apparatus in which an operator having no ordinary skill can effect negative inspection with a high efficiency.

The above and other objects of the invention are achieved by providing a photographic printing system, for automatically determining an exposure correction value, and used in a printer to correct an exposure effected based on large area transmittance densities. The printing system includes a data reading device for reading exposure correction data for a frame of a photographic film, an image scanner disposed between the printer and the data reading device for measuring a number of points of the frame of the photographic film and outputting frame density data, and a data operation unit for calculating exposure correction data for the frame based on the data from the data reader and the sensor.

Alternatively, the scanner may consist of a plurality of sensors disposed facing the light measuring position and a plurality of data operation units. Each sensor measures a number of points of a frame of the photographic film so as to output frame density data by color to the data operation unit, to calculate exposure correction data for the frame by color based on the input data from the sensor. A controller actuates the sensors one after another so that each sensor provides the exposure correction data every three frames.

The scanner also may consist of a single sensor for measuring a number of points of a frame of the photographic film so as to output frame density data by color and a plurality of data operation units for calculating exposure correction data by color for frames based on the data from the sensor. A controller connects an output of the sensor to the data operation units in order, so that each data operation unit provides the exposure correction data every three frames.

BRIEF DESCRIPTION OF THE DRAWINGS

The above and other objects and features of the present invention will be apparent from the following description directed to particular embodiments with reference to the accompanying drawings, in which the same parts are denoted by the same reference numerals, and wherein.

DETAILED DESCRIPTION OF THE PREFERRED EMBODIMENTS

Figure 1:
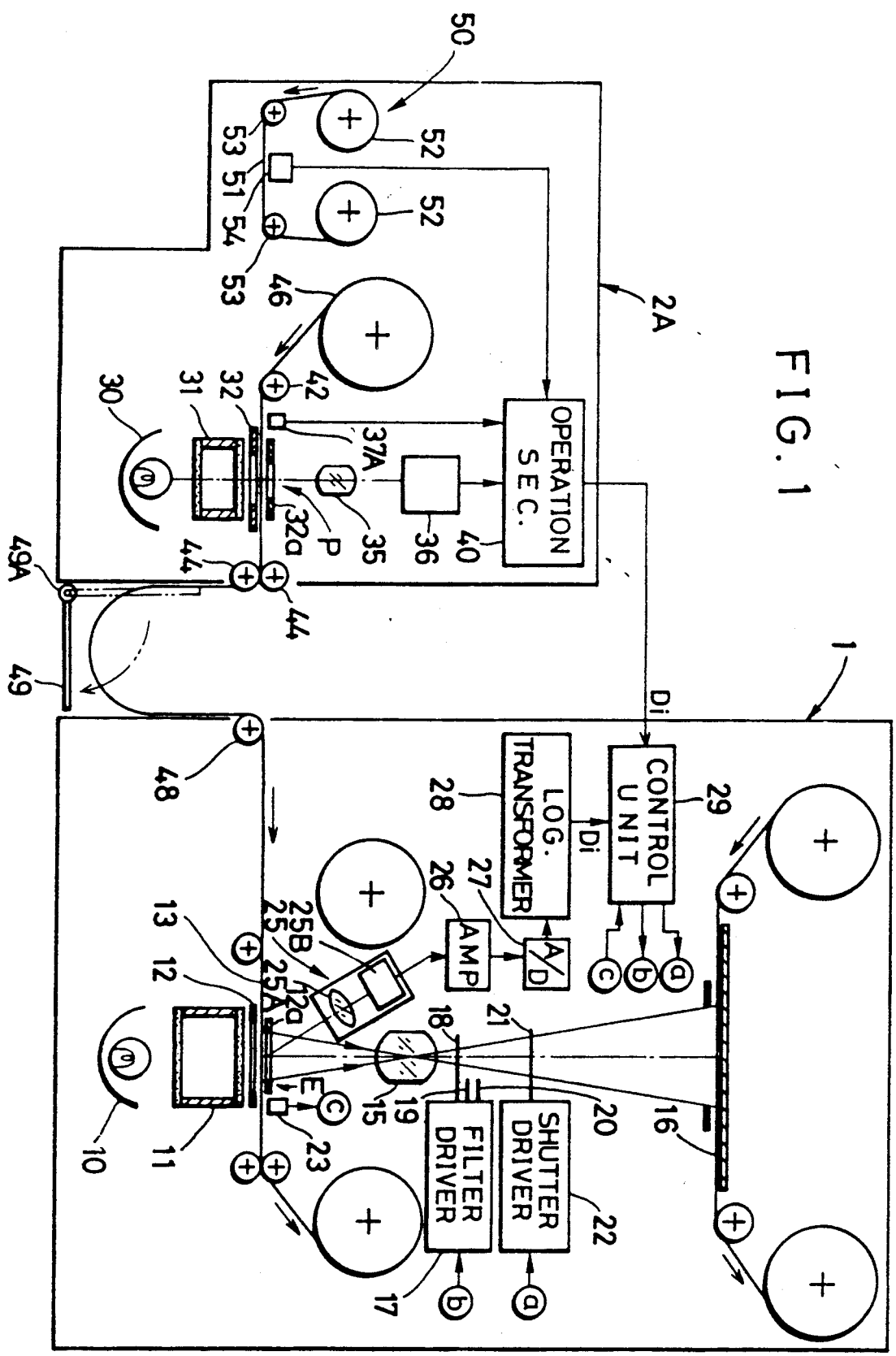
FIG. 1 is a schematic illustration showing a photographic printing system in accordance with a preferred embodiment of the present invention.

Referring to the drawings, in particular to FIG. 1, a printing system in accordance with the present invention used in cooperation with an existing printer 1 is shown, having a white light source, such as a halogen lamp 10. The white light emanating from the halogen lamp 10 passes through a mirror box 11 and is diffused sufficiently thereby. After passing through a transparent color original or color negative film 13 placed between a film holder 12 and a framing mask 12a so as to be held flat in an exposure position E, the diffused light passes through color filters 18-20, such as cyan, magenta and yellow filters and focused on a color paper 16 by means of a printing lens 15 while a shutter 21, controlled by a shutter controller 22, is open. Each color filter 18, 19, 20 is controllably insertable independently of the other two under the control of a filter controller 17. As will be described in detail later, the color negative film 13 is measured in a three color dividing method by means of an automatic exposure correction value determining apparatus 2A prior to being exposed. After exposure, the color negative film 13 is wound around a takeup reel 14.

To the upper left of the exposure position E, there is a light measuring unit 25 consisting of an image forming lens 25A and a light sensor array 25B sensitive to different colors, such as red, green and blue. The light measuring unit 25 detects a large area transmittance density (LATD) value by color and outputs an LATD value analog signal to an amplifier 26 for signal amplification. After being converted into digital form by A/D converter 27, the LATD value signal is transformed into a logarithm by a logarithmic transformer 28 and sent as a measuring gain $D_i$ (where i indicates any one of the colors, red, green and blue) to a controller 29.

The controller 29, which mainly consists of a general use microcomputer well known in the art, automatically computes an exposure by color based on the measuring gain $D_i$ and resulting data from the negative inspection by the use of an exposure calculating equation which will be described later. The controller 29 actuates the filter controller 17 to insert the color filters 18-20 at appropriate timings depending upon the exposures computed thereby. That is, when the exposure for a color is completed, the corresponding color filter is inserted into the printing path so as to cut the corresponding color component of the printing light.

On the exit side of the exposure position E, there is a notch sensor 23 for detecting notches provided in the color negative film 13, one notch for every frame, and outputting notch signals to the controller 29. The controller 29 counts the notch signals so as to recognize frames of the color negative film 13, thereby matching a frame placed in the exposure position E to a frame for which exposure correction data, including the number of notches N of the frame, is sent to the controller 29.

The automatic exposure correction value determining apparatus 2A, disposed adjacent to the existing printer 1 constructed as above, computes or calculates exposure correction data by color based on rough correction data read out from a paper tape 51 by a tape reader 50 consisting of tape reels 52, guide rollers 53 and a reading head 54 and density data detected therein in a three color dividing method. Rough correction data for each frame of the color negative film is previously provided by a visual inspection by an operator and recorded as a coded dot-pattern in the paper tape 51. The tape reader 50 reads the coded dot-pattern to output a rough correction signal to the controller 29 of the existing printer 1.

The automatic exposure correction value determining apparatus 2A has a white light source, such as a halogen lamp 30, and a mirror box 31. The white light emanating from the halogen lamp 30 passes through the mirror box 31 and is diffused sufficiently thereby. After passing through the color negative film 13 placed between a film holder 32 and a framing mask 32a in a measuring position P, the diffused light is focused on a color image area sensor 36, consisting of a charge coupled device (CCD), by means of an image forming lens 35. The color image area sensor 36 measures an image formed thereon using a three color dividing method so as to output signals representative of density values of the color negative film 13 for three colors to a data operation unit 40.

Disposed close to the film holder 32 is a notch sensor 37A identical in structure and operation to the notch sensor 23. The notch sensor 37A counts notches of the color negative film 13 and outputs frame recognizing signals, indicating the number of notches N, to the operation unit 40. The data operation unit 40, which mainly consists of a general use microcomputer well known in the art, automatically computes exposure correction data based on the rough exposure correction values from the paper tape 51 and the density values from the color image area sensor 36 for the three colors.

Data of the three color exposure correction values are sent to a self-contained memory of the data operation unit 40 at an address designated by the number of notches N for a frame. The data of the three color exposure correction values and the number of notches N are read out and transferred to the controller 29 in the same order as the corresponding frames.

To place the color negative film 13 in the film holder 32 in the measuring position P, there are feed rollers 44 on the exit side of the measuring position P. On the entrance side of the measuring position P, there is a reel 46 on which the color negative film is wound, and a guide roller 42 for guiding the color negative film, withdrawn from the reel 46, toward the measuring position P.

Adjacent to and at the same level as the feed rollers 44, a guide roller 48 is provided in the photographic printer 1. Between the feed rollers 44 and the guide roller 48, the color negative film 13 is partly formed in a loop in a space provided between the photographic printer and the automatic exposure correction value determining apparatus 2A. A guide plate 49 rotatably mounted on a pin 49A secured to the side wall of the automatic exposure correction value determining apparatus 2A is provided to guide the color negative film 13 so as to form a loop of the color negative film 13 at the beginning of loop formation.

In the operation of the photographic printing apparatus in accordance with the invention, before starting printing, the paper tape 51, bearing the data of the rough correction values and the numbers of frames for the color negative film 13, is threaded on the tape reader 50. Because the rough exposure correction value may be enough for correction, to make an image darker or brighter, an operator is not required to be sufficiently skilled to be able to inspect negative films visually and record data for density correction. The tape reader 50 reads out the data for each frame and sends them to the data operation unit 40.

At the same time, the color negative film 13 is threaded on the automatic exposure correction value determining apparatus 2A and is measured by the color image area sensor 36. Data of the three color densities measured by the color image area sensor 36 are sent to the data operation unit 40. Based on the data from the tape reader 50 and the color image area sensor 51, the data operation unit 40 automatically computes an exposure correction value $C_i$ (where i indicates any one of the three colors, red, green, and blue) by color.

Computation of the exposure correction value $C_i$ is executed in the data operation unit 40 in the following manner. Data of measured values for the three colors for a frame of the color negative film 13 are output from the color image area sensor 36 and are stored first in the self-contained memory of the data operation unit 40. The data are processed in advance for easy drawing of an image characteristic value of the frame. After effecting the drawing of the image characteristic value, the data operation unit 40 computes image pattern recognition based on the image characteristic value. The computation of image pattern recognition is performed by the use of parameters obtained from the characteristic value, the data of rough correction values, and various correction programs. The exposure correction value $C_i$ is computed using the result of image pattern recognition and a characteristic value, and a LATD of a specific point or area of the frame. Then, the data operation unit 40 stores data of the exposure correction values $C_i$ in the self-contained random access memory (RAM) at addresses designated by the number of notches N recognizing the frame. The data of the exposure correction value $C_i$ and the frame recognition notch number N are output to the controller 29. Because of the exposure correction value $C_i$ given by the number of steps of correction for density or color, as well as the rough correction value of the data which is sent from the tape reader 50, there is no need to modify the photographic printer 1 for use in cooperation with the automatic exposure correction value determining apparatus 2A.

The photographic printer 1 makes prints from the color negative film 13 after the film is measured, to provide exposure correction data in the automatic exposure correction value determining apparatus 2A. To make a print, the halogen lamp 10 is actuated to emit white illumination light. After passing the mirror box 11 and being sufficiently diffused thereby, the white light from the halogen lamp 10 illuminates the color negative film 13 in the exposure position E. The light measuring unit 25 measures light passing through the color negative film 13 to detect three color LATDs for the image frame placed in the exposure position E so as to obtain the gain values $D_i$ for the three colors. An exposure $E_i$ is computed from the following formula by the use of the gain value $D_i$ and the exposure correcting value $C_i$:

$$\text{Log } E_i = LM_i \times CS_i \times (DN_i - D_i) + PB_i + LB_i + MB_i + NB_i + \alpha \times C_i$$

where:

LM is a magnification slope coefficient which depends upon a magnification rate determined based on the sizes of the color negative film 13 and a print to be made;

CS is a color slope coefficient given for over and under exposed images inherent in the type of the color negative film 13 and selected according to the density of the image frame;

DN is the standard normal density value;

D is a gain value based on a LATD value of the image frame;

PB is a paper balance correcting value that depends upon the type of the color paper relative to a standard color paper;

LB is a lens balance correcting value that depends upon the type of the printing lens relative to a standard printing lens;

MB is the master balancing value common to all of available color negative films;

NB is a color balancing value inherent in the color negative film 13; and $\alpha$ is the number of steps given by a correction key number.

The exposure $E_i$ by color thus obtained is used to control the color filter 18, 19, 20 by means of the filter controller 17. The filter controller 17 maintains the three color filters 18–20 out of the printing light path to expose the color paper 16 with the white light for a while after the opening of the shutter 21. When the exposure of $E_i$ is obtained, the corresponding color of the color filter is inserted in the printing light path to shut out the corresponding color of component of the printing light. In the same manner, the other two color filters are inserted into the printing light path in order, thus creating a latent color image in the color paper 16.

Upon the completion of a latent color image in the color paper 16, one frame of the color paper 16 is withdrawn to place an unexposed part thereof in the exposure position E. The same procedure as for the first frame is repeated to create a latent color image for the subsequent frames of the color negative film 13.

Figure 2:
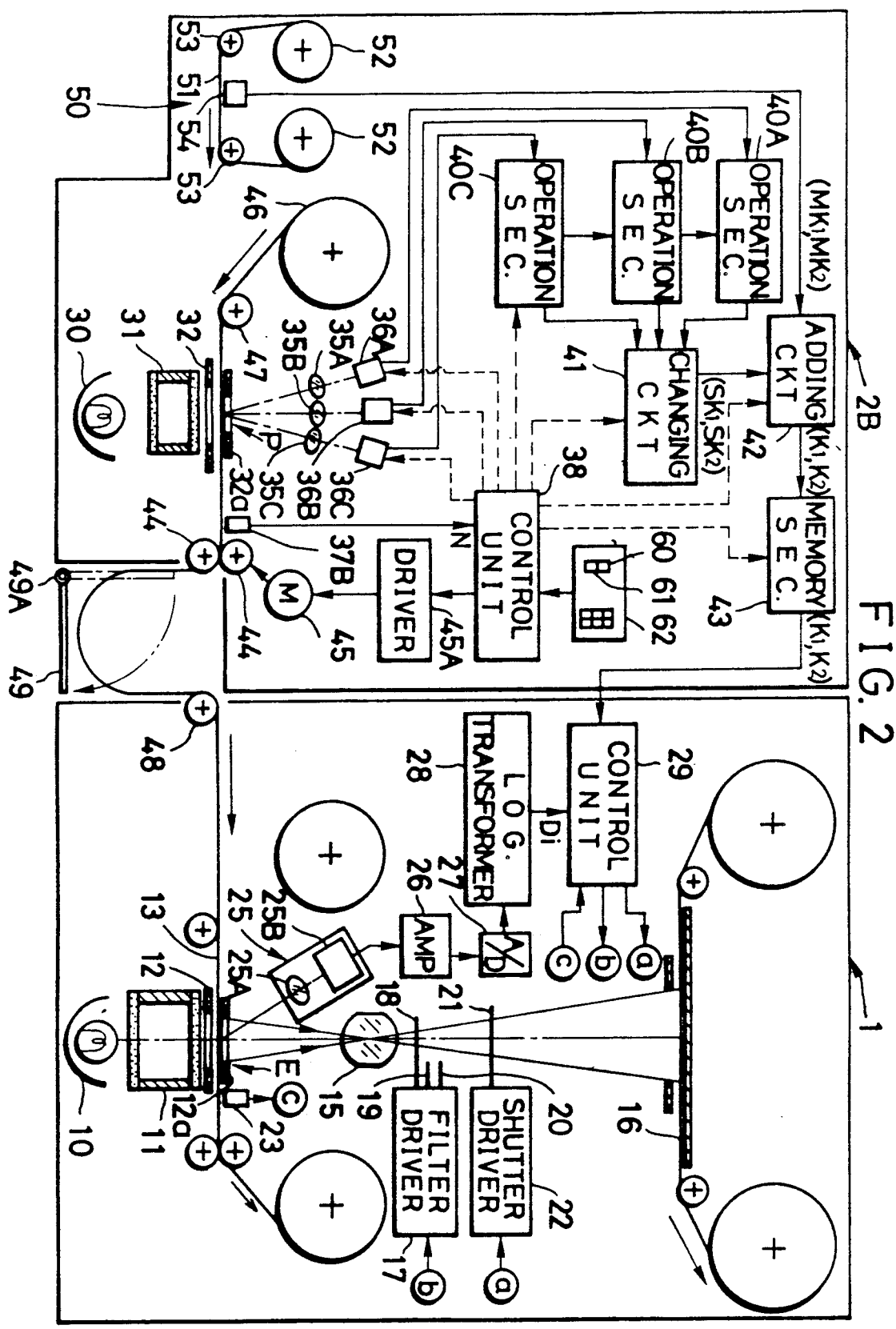
FIG. 2 is a schematic illustration showing a photographic printing system in accordance with another preferred embodiment of the present invention.

Referring to FIG. 2, a printing system in accordance with another preferred embodiment of the present invention is shown, consisting of a printing apparatus 1 and an automatic exposure correcting apparatus 2B. Because of the identity of the printing apparatus 1 and the similarity of the automatic exposure correcting apparatus 2B to those of the previous embodiment, the following description will be directed to the different structure between the automatic exposure correcting apparatus 2A and 2B.

The white light emanating from the halogen lamp 30 passes through the mirror box 31 and is diffused thereby. After passing through the color negative film 13 placed between the film holder 32 and masking frame 32a so as to be held flat in the image pickup position P, the diffused light is focused on color image area sensors 36A–36C by means of image forming lenses 35A–35C to form a negative optical image of the color negative film 13 by color, respectively. The color image area sensors 36A–36C measure separately the three color component images of the color negative film 13 and output data signals of measured values to data operation units 40A–40C separately by color.

A notch sensor 37B, disposed on the exit side of the image pickup position P, has the same structure and function to detect and count the notches of the color negative film 13 as the notch sensor 37A in the previous embodiment. The notch sensor 37B also outputs a frame number identifying signal to a controller 38. The controller 38, which mainly comprises a general use microcomputer, controls various parts of the automatic exposure correcting apparatus 2B based on the number of notches counted by the notch sensor 37B.

Three data operation units 40A-40C, each of which mainly comprise a microcomputer, are connected to outputs of the color image area sensors 36A-36C, respectively. The three color image area sensors 36A-36C are actuated in order by the controller 38 so as to measure three image frames of the color negative film 13 placed in the image pickup position P one after another. Each data operation unit 40A, 40B, 40C automatically computes separately three color exposure correction values based on the color data signals from the corresponding color image area sensor 36A, 36B, 36C. The exposure correcting data is in a form of the number of steps which is given by a correction key number.

A changing circuit 41 is controlled by the controller 38 to connect the data operation unit 40A-40C to an adder circuit 42 in order to transfer signals of the three color exposure correction values. In the adder circuit 42, the rough exposure correction value read out from the paper tape by the dot pattern reader 50 and the color exposure correction value are added together by color. The resulting exposure correction values for the three colors are stored in a memory section 43 at an address specified by the controller in accordance with the number of notches for the image frame of the color negative film 13. Upon printing, the controller 38 reads out the three color exposure correcting values from the memory section 43 and transfers them to the controller 29 of the printing apparatus 1. The drive rollers 44 disposed on the exit side of the image pickup position P are driven by a pulse motor 45 controlled by the controller 38 through a pulse motor driver 45A.

A control board 62 has mode selection keys 60 and 61. One key is for a pre-inspection mode wherein an exposure is calculated from the rough exposure correcting value read out from the paper tape and a correcting value detected by the color image area sensor added together in the adder circuit 42. The other key is for a non-inspection mode wherein no data from the paper tape is taken into account.

When the pre-inspection mode selection key 60 is pushed, the taper reader 50 activated to read the paper tape 51. Data recorded in the paper tape in a previous negative inspection are given as rough correction levels, such as positive correction, negative correction and no-correction. The tape reader 50 reads the correction data comprising a density correction value $MK_1$ and a color correction value $MK_2$ (each of which is expressed by the number of steps of a correction key) and sends them to the adder circuit 42.

The inspected color negative film 13 is withdrawn from the reel 46 frame by frame and placed in the image pickup position P. The color image area sensors 36A-36C measure first three image frames of the color negative film 13 in order to output density and color signals for the first three image frames to the data operation units 40A-40C, respectively, using a three color separation method, and provide density and color correcting values $SK_1$ and $SK_2$. That is, when the first image frame is placed in the image pickup position P, the color image area sensor 36A measures the first image frame to output density and color signals to the data operation unit 40A. The data operation unit 40A automatically calculates density and color correcting values $SK_1$ and $SK_2$ for the first image frame.

Upon completion of measurement for the first image frame, the color negative film 13 is forwarded by one frame to place the second frame of the first three image frames in the image pickup position P. Then, the color image area sensor 36B measures the second image frame to output density and color signals to the exposure correction value operation unit 40B. The exposure correction value operation unit 40B automatically calculates density and color correcting values $SK_1$ and $SK_2$ for the second image frame. In the same manner as for the first and second image frames, the color image area sensor 36C measures the third image frame to output density and color signals to the exposure correction value operation unit 40C. The exposure correction value operation unit 40C automatically calculates density and color correcting values $SK_1$ and $SK_2$ for the third image frame.

After the measurement of the first three image frames, the color image area sensors 36A-36C measures the next three image frames in order in the same manner as for the first three image frames. Thus, all of the image frames of the color negative film 13 are measured.

Computation of each exposure correction value ($SK_1$, $SK_2$) is performed in each data operation unit 40A, 40B, 40C in the following manner. That is, measured values of the pixels of a frame for the three colors from the color image area sensors 36A-36C are stored first in the self-contained memories of the data operation units 40A-40C, respectively, and are processed for easy drawing of an image characteristic value of the frame. After effecting the withdrawal of an image characteristic value, the data operation units 40A-40C effect computation of image pattern recognition based on the image characteristic value. The computation of image pattern recognition is performed based on parameters obtained from the image characteristic value in various correction programs. The exposure correction values ($SK_1$, $SK_2$) are computed by the use of the result of image pattern recognition and an image characteristic value and LATDs of a specific point or area of the frame. The exposure correction value data ($SK_1$, $SK_2$) is given by the number of steps of correction for density or color.

Eventual exposure correction values $K_1$ and $K_2$ for density and color, respectively, are calculated by the use of the following equation by the adding circuit 42:

$$K_1 = MK_1 + SK_1$$

$$K_2 = MK_2 + SK_2$$

Data of the eventual exposure correction values ($K_1$, $K_2$) thus obtained by color are stored in the memory unit 43 at addresses designated by the number of notches N counted for the frame. The data of the eventual exposure correction values ($K_1$, $K_2$) are output to the controller 29 of the photographic printer 1 upon printing.

Although, in this embodiment, three sets of color image area sensors 36A-36C and data operations units 40A-40C are provided, the number of sets to be installed is determined depending upon the processing capacity of the photographic printer 1. That is, expressing the capacity of computing data of the data operation unit of the automatic exposure correction value determining apparatus and the capacity of processing of the photographic printer by average times $T_1$ and $T_2$ for one frame, respectively, it is necessary to install the data operation units as many as a number of m that should satisfy $T_1 \leq m \times T_2$, or $m \geq T_1/T_2$.

The light measuring unit 25 measures light passing through the color negative film 13 to detect three color LATDs for the frame placed in the exposure position E and obtain the gain values $D_i$ for the three colors. An exposure $E_i$ is computed from the following equation by the use of the gain value $D_i$ and the eventual exposure correcting value $K_1$ and $K_2$:

$$\text{Log } E_i = LM_i \times CS_i \times (DN_i - D_i) + PB_i + LB_i + MB_i + NB_i + \alpha \times K_1 + \beta \times K_2$$

where:
  LM is a magnification slope coefficient which depends upon a magnification rate determined based on the sizes of the color negative film 13 and a print to be made;
  CS is a color slope coefficient given for over and under exposed images inherent in the type of the color negative film 13 and selected according to the density of the frame;
  DN is the standard normal density value;
  D is a gain value based on a LATD value of the frame;
  PB is a paper balance correcting value depending upon the type of the color paper relative to a standard color paper;
  LB is a lens balance correcting value depending upon the type of the printing lens relative to a standard printing lens;
  MB is the master balancing value common to all of available color negative films;
  NB is a color balancing value inherent in the color negative film 13;
  $\alpha$ is the number of steps of density correction given by a correction key number; and
  $\beta$ is the number of steps of color correction given by a correction key number.

In the same manner as in the previous embodiment, the controller 29 controls the color filters 18-20 based on the exposures $E_i$, thereby making a print that has its density and color properly corrected.

If selecting a pre-inspection skipping mode, the data from the tape reader 50 is neglected and therefore, the data from the data operation units 40A-40C are stored directly in the memory unit 43. In this case, because of the impossibility of recognizing frames by the numbers of notches, another sensor, such as a frame edge sensor or a perforation counter, should be installed.

Figure 3:
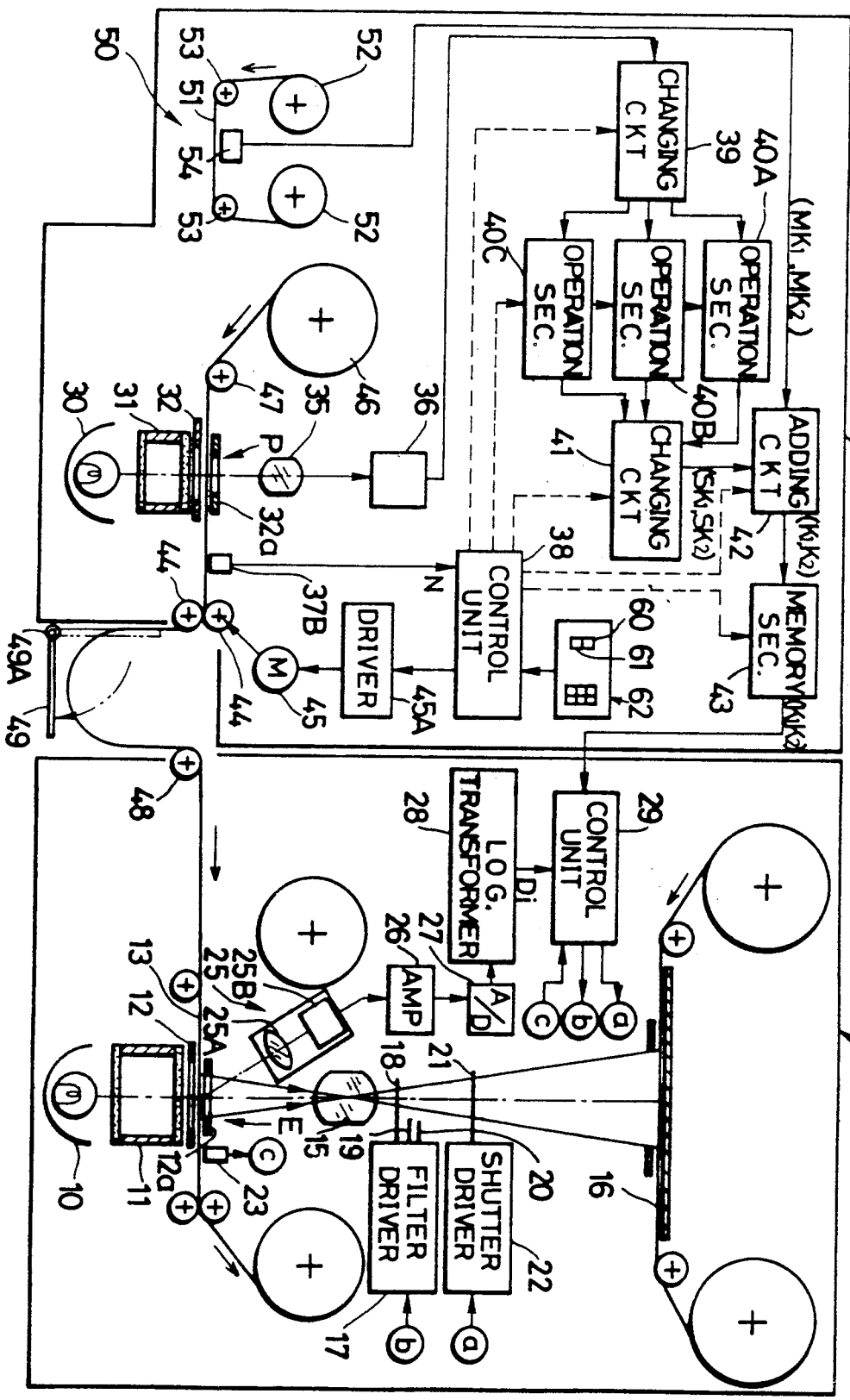
FIG. 3 is a schematic illustration showing a photographic printing system in accordance with still another preferred embodiment of the present invention.

Referring to FIG. 3, a printing system in accordance with still another preferred embodiment of the present invention is shown, consisting of a printing apparatus 1 and an automatic exposure correction value determining apparatus 2C. Because of the identity of the printing apparatus 1 and the similarity of the automatic exposure correction value determining apparatus 2C to those of the previous embodiments, the following description will be directed to the structural difference of the automatic exposure correction value determining apparatus 2C from those in the previous embodiments.

A significant difference of the automatic exposure correction value determining apparatus 2C is in that a single color image area sensor 36 is provided to output density data for three consecutive frames to three data operation units 40A-40C, respectively. However, the color image area sensor 36 and the three data operation units 40A-40C are identical in structure and operation to those in the first and second embodiments, respectively. This is made in an attempt to simplify the structure of the automatic exposure correction value determining apparatus 2C further without lowering the efficiency of use of the photographic printer 1.

The automatic exposure correction value determining apparatus 2C shown in FIG. 3 has a single color image area sensor 36 with an image forming lens 35. The color image area sensor 36 measures frames of the color film 13 frame by frame. Outputs from the color image area sensor 36 are sent to three data operation units 40A-40C, separately by color, frame by frame. Therefore, the data operation units 40A, 40B, and 40C receive data of first to third frames of every three consecutive frames of the color negative film 13. To deliver the data of the three consecutive frames to the three data operation units 40A-40C, a change in circuit 39 is provided to connect the color image area sensor 36 to the three data operation units 40A-40C in this order.

In operation of the automatic exposure correction value determining apparatus 2C, the color negative film 13 is threaded on the automatic exposure correction value determining apparatus 2C and forwarded frame by frame. When the first frame is placed in the measuring position P, the controller 38 causes the changing circuit 39 to connect the color image area sensor 36 to the first data operation unit 40A. The color image area sensor 36 measures the first frame to output data of measured values for the first frame to the first data operation unit 40A. There, exposure correction values ($SK_1$, $SK_2$) are computed.

After the measurement of the first frame, when the color negative frame 13 is forwarded by one frame so as to place the second frame in the measuring position P, the controller 38 causes the changing circuit 39 to connect the color image area sensor 36 to the second data operation unit 40B. The color image area sensor 36 measures the second frame to output data of measured values for the second frame to the second data operation unit 40B. There, exposure correction values ($SK_1$, $SK_2$) for the second frame are computed.

After the measurement of the second frame, when the color negative frame 13 is forwarded by one frame so as to place the third frame in the measuring position P, the controller 38 causes the changing circuit 39 to connect the color image area sensor 36 to the third data operation unit 40C. The color image area sensor 36 measures the third frame to output data of measured values for the third frame to the third data operation unit 40C. There, exposure correction values ($SK_1$, $SK_2$) for the third frame are computed.

At the elapse of a predetermined time period, the controller 38 causes the changing circuit 41 to connect the three data operation units 40A-40C in order to the adding circuit 42. This sequential operation is repeated every three consecutive frames.

Figure 4:
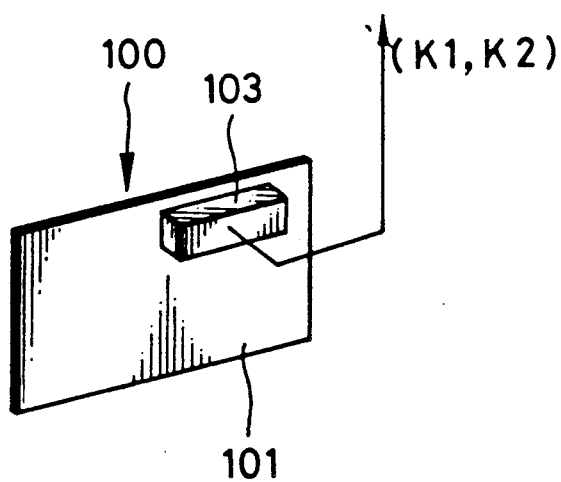
FIG. 4 is a schematic perspective illustration showing a memory card and a read-write head.

In any embodiment described above, various changes may be apparent. For example, the paper tape 51 and the tape reader 50 may be replaced with a semiconductor type of memory card, such as an IC card or an LSI card, and a read-write head, both of which may take any well known form, such as described in U.S. Pat. No. 4,827,109. As shown in FIG. 4, an LSI memory card 100 comprising various sheet coils, a power source circuit, an LSI memory, an LSI gate array and a battery which are all embedded in a relatively thin plastic plate 101, is conveniently used. A read-write head 103 is provided with various coils corresponding to the sheet coils of the LSI card 100. By the read-write head 103, exposure correction value data ($K_1$, $K_2$) provided in the automatic exposure correction value determining apparatus 2A, 2B or 2C are written in and read out from the LSI card 100. Alternatively, a floppy memory and a floppy drive may be used to record exposure correction value data ($K_1$, $K_2$).

In place of outputting the exposure correction value data in the form of the number of steps of density correction or color correction, the data may be output in the form of a substantial exposure correction value of $\alpha \times K_1 + \beta \times K_2$.

Although, in the above embodiment, rough correction value data and exposure correction value data added together in the adding circuit 42 are output to the controller 29 of the photographic printer 1, alternatively, rough correction value data may be used supplementarily to compute an eventual exposure correction value in the data operation units 40A, 40B, 40C. Otherwise, in place of outputting eventual exposure correction data in the number of steps of correction, data may be output in a coefficient by which the term ($DN_i - D_i$) of the equation is multiplied.

Although the present invention has been fully described by way of the particular embodiments thereof with reference to the accompanying drawings, various changes and modifications will be apparent to those of working skill in the technical field. Therefore, unless otherwise these changes and modifications depart from the scope of the present invention, they should be construed as included therein.

What is claimed is:

1. A photographic printing system for automatically determining an exposure correction value used in a printer to correct an exposure effected based on large area transmittance densities (LATD), said system comprising:
    a data reading device for reading exposure correction data for a frame of a photographic film, said data reading device comprising a tape reader for reading a coded pattern indicating a rough exposure correction value recorded in a paper tape, and means for inputting said rough exposure correction value manually, after visual inspection;
    an image sensor, disposed between said printer and said data reading device, for measuring a number of points of said frame of said photographic film and outputting density data of said frame accordingly; and
    a data operation unit for calculating said exposure correction value for said frame based on said data from said data reading device and said image sensor.

2. An photographic printing system for automatically determining an exposure correction value used in a printer to correct an exposure effected based on large area transmittance densities (LATD), said system comprising:
    a data reading device for reading exposure correction data for a frame of a photographic film, said data reading device comprising a card reader for reading rough exposure correction value data recorded in a semiconductor card, and means for inputting said rough exposure correction value manually, after visual inspection;
    an image sensor, disposed between said printer and said data reading device, for measuring a number of points of said frame of said photographic film and outputting density data of said frame accordingly; and
    a data operation unit for calculating said exposure correction value for said frame based on said data from said data reading device and said image sensor.

3. A photographic printing system as defined in claim 2, wherein said semiconductor card comprises an LSI card.

4. A photographic printing system for automatically determining an exposure correction value used in a printer to correct an exposure effected based on large area transmittance densities (LATD), said system comprising:
    a data reading device for reading exposure correction data for a frame of a photographic film;
    a film forwarding means for forwarding a negative film to a light measuring position frame by frame;
    a plurality of scanners disposed facing said light measuring position, each of said scanners comprising:
        a sensor for measuring a number of points of a frame of said photographic film and outputting density data of said frame for three colors accordingly; and
        a data operation unit for calculating said exposure correction value by color for said frame based on said data from said sensor;
    said photographic printing system further comprising a controller for actuating said scanners one after another so that each scanner provides said exposure correction value every three frames.

5. A photographic printing system as defined in claim 4, wherein said data reading device comprises means for reading out a rough exposure correction value by color.

6. A photographic printing system as defined in claim 5, wherein said means for reading said rough exposure correction value comprises means for inputting said rough exposure correction value manually, after visual inspection.

7. A photographic printing system as defined in claim 6, wherein said data reading device comprises a tape reader for reading a coded pattern indicating said rough exposure correction value recorded in a paper tape.

8. A photographic printing system as defined in claim 6 wherein said data reading device comprises a card reader for reading rough exposure correction value data recorded in a semiconductor card.

9. A photographic printing system as defined in claim 8, wherein said semiconductor card comprises an LSI card.

10. A photographic printing system for automatically determining an exposure correction value used in a printer to correctively control an exposure effected based on large area transmittance densities, said system comprising:
    a data reading device for recording exposure correction data for a frame of a photographic film;
    film forwarding means for forwarding a negative film to a light measuring position frame by frame;
    a sensor for measuring a number of points of a frame of said photographic film so as to output data of density of said frame by color;

a plurality of data operation units for calculating exposure correction data by color for frames based on said data from said image sensor; and a controller for connecting an output of said sensor to said data operation units so that said each data operation unit provides said exposure correction data every three frames.

11. A photographic printing system as defined in claim 10, wherein said data reading device comprises means for reading out a rough exposure correction value by color.

12. A photographic printing system as defined in claim 11, wherein said means for reading out said rough exposure correction value comprises means for inputting said rough exposure correction value manually, after visual inspection.

13. A photographic printing system as defined in claim 12, wherein said data reading device comprises a tape reader for reading a coded pattern indicating said rough exposure correction value recorded in a paper tape.

14. A photographic printing system as defined in claim 12, wherein said data reading device comprises a card reader for reading rough exposure correction value data recorded in a semiconductor card.

15. A photographic printing system as defined in claim 14, wherein said semiconductor card comprises an LSI card.

16. A light measuring apparatus for a printer comprising:

film forwarding means for forwarding a negative film to a light measuring position frame by frame;

a plurality of scanners disposed facing said light measuring position, each said scanner comprising:

a sensor for measuring a number of points of a frame of said photographic film and outputting frame density data of said frame for three colors accordingly; and a data operation unit for calculating exposure correction data by color for said frame based on said data from said sensor;

said light measuring apparatus further comprising a controller for actuating said scanners one after another so that each scanner provides said exposure correction data every three frames.

17. A light measuring apparatus for a printer comprising:

film forwarding means for forwarding a negative film to a light measuring position frame by frame;

a sensor for measuring a number of points of a frame of said photographic film and outputting density data of said frame by color accordingly;

a plurality of data operation units for calculating exposure correction data by color for frames based on said data from said sensor; and a controller for connecting an output of said sensor to said data operation units so that said each data operation unit provides said exposure correction data every three frames.

* * * * *